Oct. 11, 1966  R. W. REYNOLDS ETAL  3,277,708

FLOW CONTROL DEVICE

Filed Sept. 6, 1963

Inventors:
Richard W. Reynolds
Ronald L. Priebe
By: Hofgren, Brady, Wegner,
Allen & Stellman
Attorneys

United States Patent Office 3,277,708
Patented Oct. 11, 1966

3,277,708
FLOW CONTROL DEVICE
Richard W. Reynolds, Rockford, Ill., and Ronald L. Priebe, Beloit, Wis., assignors to Sundstrand Corporation, a corporation of Illinois
Filed Sept. 6, 1963, Ser. No. 307,107
9 Claims. (Cl. 73—211)

This invention relates to devices for sensing flow in a liquid conduit and more particularly to a device for providing a constant coefficient of fluid discharge through an orifice independent of viscosity.

Hydraulic devices often require means for sensing fluid flow as to a hydraulic motor, for appropriately controlling system components such as a metering valve operably associated with the motor for maintaining constant motor speeds, for example. Flow in a liquid conduit may be sensed by sensing pressure drop across an orifice in the path of flow in the conduit. Specifically, pressure immediately upstream from the orifice may be compared with that immediately downstream therefrom, and variations in the pressure differential utilized to control the metering valve.

However, certain problems arise in attempting to sense fluid flow in such systems. More particularly, pressure drop (DP) across an orifice may be defined by the equation, $$DP = \frac{Q^2 R}{Cd^2 A^2}$$

where Q is the flow in cubic inches per second, $Cd$ is the coefficient of discharge of the orifice, A is the area of the orifice in square inches and R is the density of the fluid in pounds per cubic inch. A is constant and R varies linearly with temperature and thus this variation can be easily compensated for. However, $Cd$ varies substantially with changes in viscosity (due to temperature) at low values of Reynolds number, that is, in the low temperature, high viscosity range, and DP does not vary directly with variation in volumetric flow, but as the square of the flow. Reynolds number is a factor obtained by multiplying the velocity of the stream of fluid flow by the diameter of the conduit in which flow is taking place and dividing the result by the kinematic viscosity of the fluid $$\left(Nr = \frac{\text{stream velocity} \times \text{conduit diameter}}{\text{kinematic viscosity}}\right)$$

Kinematic viscosity is that factor obtained by dividing the absolute viscosity of a liquid by the mass density thereof.

At higher values of Reynolds number, the flow pattern through an orifice is generally uniformly turbulent, and $Cd$ is relatively constant. At low values of Reynolds number, fluid flows with generally uniform velocity distribution and smoothness, a condition which may be described as laminar flow, and $Cd$ varies widely with variations in $Nr$. During the transition from laminar flow to turbulent flow, the flow pattern is in an extremely unstable state and $Cd$ varies substantially with variations in $Nr$. If turbulence can be produced at extremely low values of Reynolds number, the coefficient of discharge dependent upon turbulent flow conditions will tend to be more constant for lower values of Reynolds number.

Where the orifice is extremely small as compared to the conduit size, the coefficient of discharge is generally constant because of the natural turbulence produced by fluid crowded through the small orifice. In such conduits a substantial amount of fluid flows toward the orifice from the sides of the pipe, across the face of the orifice plate. However, in the case of a conduit which is relatively not much larger than the orifice the natural turbulence is substantially less and $Cd$ varies over a wider range of Reynolds number. Increasing conduit diameter in the upstream area or extremely decreasing the orifice diameter often is not mechanically or economically feasible due to restrictions in unit sizes or existing dimensional limitations of devices embodying the pressure sensing means. Thus, the problem is, in a conduit of constant diameter, to obtain turbulent flow conditions such as those produced by a liquid conduit of much larger diameter upstream from the orifice.

It is a primary object of this invention to provide a new and improved device for controlling the flow of fluid in a conduit, and particularly useful with a metering valve or measuring instrument.

It is another object of this invention to provide a new and improved orifice device in a liquid conduit including a circular plate orifice and means upstream from the orifice for producing a constant coefficient of discharge of liquid independent of the viscosity thereof.

It is still another object of this invention to provide a new and improved orifice forming device for a liquid conduit including a central circular plate orifice and means disposed upstream from the orifice for directing liquid flow generally outward towards the walls of the conduit and thence inwardly immediately adjacent the orifice, thus producing a constant coefficient of discharge for liquids independent of the viscosity thereof. In a preferred embodiment the last mentioned means comprises a ball-shaped member. In another it is a part spherical member. Another embodiment comprises crossed wires or rods.

Further objects and advantages will become apparent from the following detailed description taken in connection with the accompanying drawings, in which.

Figure 1:
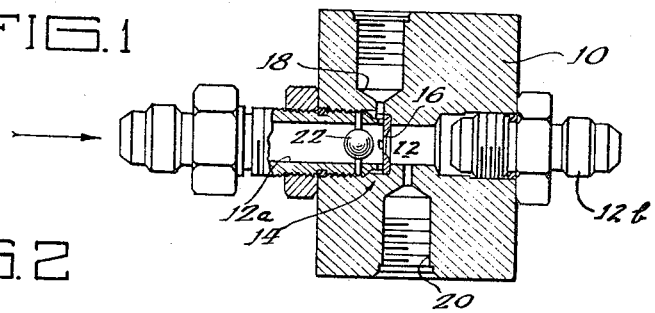
FIG. 1 is a side elevational view in partial section of a device embodying this invention.

While this invention is susceptible of embodiment in many different forms, there is shown in the drawings and will herein be described in detail several embodiments of the invention with the understanding that the present disclosure is to be considered as an exemplification of the principles of the invention and is not intended to limit the invention to the embodiment illustrated. The scope of the invention will be pointed out in the appended claims.

In FIG. 1 there is shown a unit housing or block 10 through which a liquid conduit passes including a passage 12, an inlet fitting 12a and an outlet fitting 12b, both communicating with the passage. Positioned in the housing is a flow control device 14 which may be utilized as a component of a flow sensing means. Included in the flow control device 14 and positioned in the path of of fluid flow is a flow restricting means 16 including a generally thin flat disc 16a positioned substantially normal to the path of fluid flow and having an orifice 16b therein formed on a common center line with the liquid conduit. Ports 18 and 20 are located immediately upstream and downstream, respectively, from the orifice 16 and open to the interior of the conduit. These ports are adapted for operable communication with an appropriate device which senses the pressure differential across the orifice to determine fluid flow in the conduit, such as, for example, a metering valve for controlling the speed of a hydraulic motor.

Figure 2:
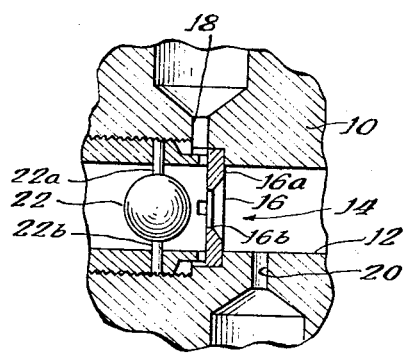
FIG. 2 is an enlarged fragmentary section view of a portion of FIG. 1.

As shown in FIGS. 1 and 2, positioned closely upstream from the orifice 16 is a sphere or ball 22 which is supported in the conduit by pins 22a and 22b in the path of fluid flow therein. This ball 22 provides means for creating turbulence and producing a flow generally perpendicular to the orifice across the face of plate 16a such as would be obtained by utilizing a conduit of increased diameter upstream of the orifice. As shown in FIG. 2, the ball causes fluid flow to be diverted outwardly towards the interior walls of the conduit from which it is directed inwardly immediately in front of the orifice 16, thus creating the aforementioned turbulence.

This invention comprehends a means for producing a constant coefficient of discharge for liquid flow through a restriction in a liquid conduit such as a disc-type orifice, and is most effective where the opening is relatively large with regard to the diameter of the conduit, that is, more than one-fourth of the diameter of the conduit.

In one specific embodiment tested wherein favorable results were obtained, the orifice had a diameter of approximately one-half that of the conduit upstream and the ball was approximately eight-tenths of the diameter of the conduit. By placing the center of the ball slightly more than half the conduit diameter upstream from the orifice, the turbulence produced caused a substantially constant coefficient of discharge of fluid independent of the viscosity thereof even at extremely low values of Reynolds number. Best results appear to be produced where the ratio of ball diameter to orifice diameter is about 1.75 while holding the ratios referred to above.

Figure 6:
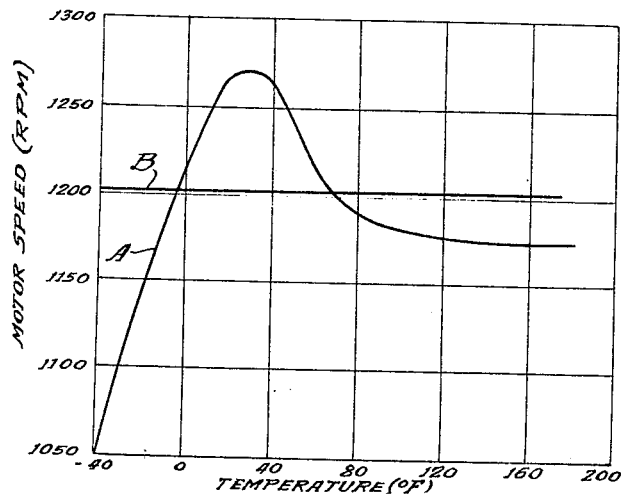
FIG. 6 is a graphical illustration in the form of a chart comparing the results obtained in liquid conduits embodying the device of this invention as opposed to those conduits which do not include the device of this invention.

The results obtained in the embodiment referred to above are graphically illustrated in FIG. 6, wherein the vertical numbers represent speed in revolutions per minute of a motor supplied by fluid flow through the orifice and having its speed controlled by controlling flow thereto with a metering valve sensing pressure drop across the orifice. The horizontal numbers represent temperature of the fluid in degrees Fahrenheit. Line A represents a variation in the motor speed over the temperature ranges of the fluid in a device wherein there is no ball or other obstruction placed upstream from the orifice. Line B represents constant motor speed over the temperature range wherein the aforementioned components including the ball, are present in the system and dramatically illustrate the advantages as compared to the extreme variation in motor speed over the temperature range illustrated by line A. The effect of placing the ball upstream from the orifice is to enable a constant motor speed over varying temperature (viscosity) ranges.

Figure 3:
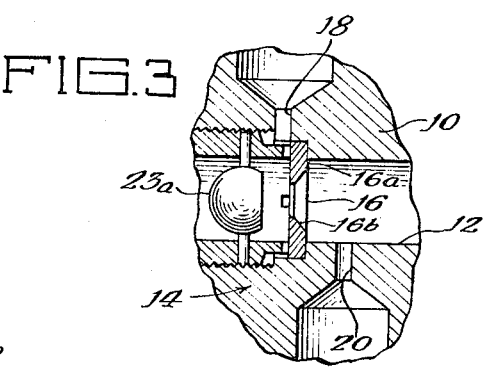
FIG. 3 is an enlarged fragmentary view similar to FIG. 2 showing a second embodiment of this invention.
Figure 4:
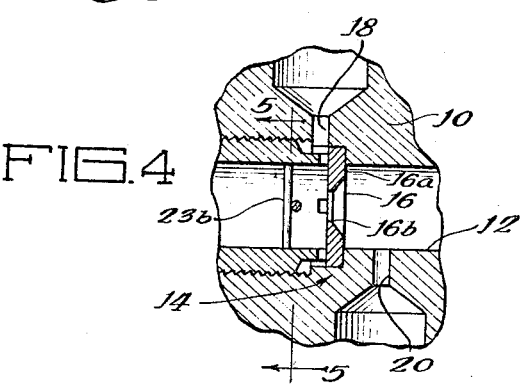
FIG. 4 is an enlarged fragmentary section view similar to FIG. 2 showing a third embodiment of this invention.
Figure 5:
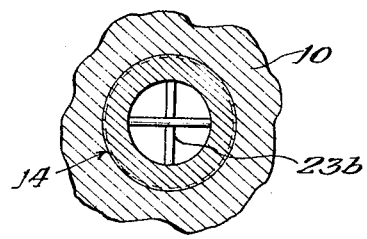
FIG. 5 is a section view taken along the line 5—5 of FIG. 4.

FIGS. 3 and 4 represent other embodiments of this invention. In FIG. 3, a truncated sphere, 23a, is placed in approximately the same position as the aforementioned ball 22, with the flat face of the sphere in opposed spaced relation to the orifice. This produces substantially the same fluid flow effect as obtained by the ball 22. FIGS. 4 and 5 show the use of crossed wires or rods 23b positioned upstream from the orifice 16. This, too, can cause the desired turbulence to produce improved results in the constant coefficient of discharge for low values of Reynolds number. Other shapes of turbulence producing means may be inserted in the approximate position illustrated by the ball 22, truncated sphere 23a, or the cross wires 23b to produce the desired flow pattern resulting in a generally constant coefficient of discharge.

In particular, this invention provides a means for stabilizing the coefficient of discharge even with changes in viscosity at low values of Reynolds number so that the pressure drop is more representative of volumetric flow. Applicants' solution is dramatically simple, economical and is capable of incorporation in standard production units without substantial modification of existing sensing devices or units in which they are presently incorporated.

We claim:

1. In a device for sensing flow in a liquid conduit: a plate across the passage in the conduit having an orifice in said conduit in the path of fluid flow; means for sensing the liquid pressure differential across said orifice; and means upstream from said orifice for diverting liquid flow generally outward towards the walls of said conduit and thence inwardly therefrom to create turbulence in said conduit in front of said orifice, said diverting means including a ball supported centrally in said conduit in front of said orifice.

2. In a device for sensing flow in a liquid conduit: a plate across the passage in the conduit having an orifice in said conduit in the path of fluid flow; means for sensing the liquid pressure differential across said orifice; and means upstream from said orifice for diverting liquid flow generally outward towards the walls of said conduit, said diverting means being sufficiently close to said orifice to create turbulence in said conduit in front of said orifice by generally radial flow thereacross, said means for diverting liquid flow comprising a truncated sphere supported centrally in said conduit in front of said orifice.

3. In a device for sensing flow in a liquid conduit: a plate across the passage in the conduit having an orifice in said conduit in the path of fluid flow; means for sensing the liquid pressure differential across said orifice; and means upstream from said orifice for diverting liquid flow generally outward towards the walls of said conduit and thence inwardly therefrom to create turbulence in said conduit in front of said orifice, said diverting means including a truncated sphere supported centrally in said conduit in front of said orifice.

4. In a liquid conduit of constant diameter: a disc in said conduit in the path of fluid flow having an orifice therein, said orifice having a diameter approximately one-half that of the conduit; means for sensing the liquid pressure differential across the orifice and means larger than said orifice and upstream therefrom a sufficient distance to cause a condition of fluid flow in front of said orifice similar to that produced by a conduit having a larger diameter in the area immediately in front of said orifice, said means to cause a condition of fluid flow being spherically shaped and approximately eight-tenths the diameter of said conduit.

5. The device of claim 4 wherein said spherically shaped means has its center spaced upstream from said orifice slightly more than one-half of the conduit diameter.

6. The device of claim 5 wherein the spherically shaped means has a diameter approximately 1.75 times the diameter of the orifice.

7. In a device for sensing liquid flow in a conduit; means providing a restrictive orifice in said conduit in the path of fluid flow, said orifice having a diameter less than the diameter of the conduit, means for sensing the pressure differential across said orifice; and means for maintaining a substantially constant discharge coefficient at said orifice including means for diverting the fluid flow upstream of the orifice generally outward toward the walls of said conduit and thence inward therefrom across the orifice, said diverting means including a member separate from and supported within said conduit spaced upstream from said orifice, said conduit defining with the member a peripheral flow passage around said member, whereby fluid is diverted outward around said member against the conduit and then radially inward across the orifice in the space between the orifice and said diverting member.

8. The device of claim 7 wherein said conduit is of constant diameter for a substantial distance upstream of said orifice, said orifice having a diameter at least .25 times that of the conduit.

9. The device of claim 7 wherein said member is spaced less than one diameter of the conduit upstream of the orifice.

References Cited by the Examiner

UNITED STATES PATENTS

| | | | |
|---|---|---|---|
| 1,940,921 | 12/1933 | Smith | 73—205 |
| 2,306,940 | 12/1942 | Fischer | 73—211 |
| 2,549,624 | 7/1951 | Moore | 73—205 X |
| 2,561,700 | 7/1951 | Hughes | 73—211 |
| 2,929,248 | 3/1960 | Sprenkle | 73—211 X |
| 2,984,105 | 5/1961 | Nagel et al. | 73—211 X |

RICHARD C. QUEISSER, *Primary Examiner.*

E. D. GILHOOLY, *Assistant Examiner.*